United States Patent [19]

Wunder

[11] Patent Number: 5,642,895
[45] Date of Patent: Jul. 1, 1997

[54] CONVERTIBLE WORK BENCH TO HAND TRUCK APPARATUS

[76] Inventor: Richard Wunder, 49 E. Prescott Ave., Colonia, N.J. 07067-1410

[21] Appl. No.: 546,814

[22] Filed: Oct. 23, 1995

[51] Int. Cl.$^6$ ........................................ B62B 1/04
[52] U.S. Cl. ........................................ 280/30; 280/47.27
[58] Field of Search .................. 280/30, 639, 651, 280/652, 654, 47.24, 47.27; 108/127

[56] References Cited

U.S. PATENT DOCUMENTS

| | | | |
|---|---|---|---|
| 4,533,151 | 8/1985 | Maitland | 280/30 |
| 5,085,447 | 2/1992 | Audibert | 280/30 |
| 5,092,615 | 3/1992 | Gregalis | 280/30 |
| 5,201,536 | 4/1993 | Bono et al. | 280/30 |
| 5,382,032 | 1/1995 | Wilson | 280/30 |
| 5,547,205 | 8/1996 | de Rosario Sousa de Cabol | 280/30 |

*Primary Examiner*—Richard M. Camby

[57] ABSTRACT

A convertible work bench to hand truck apparatus including a table that has a top surface, a bottom surface, and a pair of long edges with short edges therebetween. One of the short edges of the table has a projection extending above its top surface. The back surface of the table has a plurality of large support brackets, a plurality of small support brackets, a plurality of leg retainers and a pair of triangular handles attached thereto. Each support bracket and each leg retainer is attached to the bottom surface of the table. Also, included is a plurality of legs. Each leg has a foot end and a connecting end that is rotatably coupled with one of each support brackets of the table. The plurality of legs form a first support leg and a second support leg when a support bar connects a parallel pair of the plurality of legs. Each support leg supports the table above a receiving surface. Lastly, a pair of wheels are mounted to the bottom surface by a rigid bracket.

8 Claims, 3 Drawing Sheets

5,642,895

CONVERTIBLE WORK BENCH TO HAND TRUCK APPARATUS

BACKGROUND OF THE INVENTION

1. Field of the Invention

The present invention relates to a convertible work bench to hand truck apparatus and more particularly pertains to providing a work bench that is mobile for the convenience of the user and further providing a work bench that can be converted into a hand truck for transportation of heavy items, by the user, from one place to another.

2. Description of the Prior Art

The use of portable work benches is known in the prior art. More specifically, portable work benches heretofore devised and utilized for the purpose of moving the work benches to a convenient work location are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,170,719 to Pestone discloses a hide-a-way work bench. U.S. Pat. No. 4,875,513 to Skarsten discloses a portable work bench. U.S. Pat. No. 4,856,435 to Larson discloses a stowable work bench. U.S. Pat. No. Des. 311,083 to Dutro discloses a hand truck. U.S. Pat. No. Des. 251,039 to Reppas discloses a combination work bench and bed. Lastly, U.S. Pat. No. Des. 249,032 to Tarran discloses a combined hand truck and ladder.

While these devices fulfill their respective, particular objectives and requirements, the aforementioned patents do not describe convertible work bench to hand truck apparatus that allows a user to transport a work bench and any heavy equipment to the working area by the work bench being convertible into a hand truck and, once the heavy items are removed from the hand truck portion, allowing the work bench to be placed in an upright position for creation of a work station.

In this respect, the convertible work bench to hand truck apparatus according to the present invention substantially departs from the conventional concepts and designs of the prior art, and in doing so provides an apparatus primarily developed for the purpose of providing a work bench that is mobile for the convenience of the user and further providing a work bench that can be converted into a hand truck for transportation of heavy items by the user from one place to another.

Therefore, it can be appreciated that there exists a continuing need for a new and improved convertible work bench to hand truck apparatus which can be used for providing a work bench that is mobile for the convenience of the user and further providing a work bench that can be converted into a hand truck for transportation of heavy items by the user from one place to another. In this regard, the present invention substantially fulfills this need.

SUMMARY OF THE INVENTION

In view of the foregoing disadvantages inherent in the known types of portable work benches now present in the prior art, the present invention provides an improved convertible work bench to hand truck apparatus. As such, the general purpose of the present invention, which will be described subsequently in greater detail, is to provide a new and improved convertible work bench to hand truck apparatus and method which has all the advantages of the prior art and none of the disadvantages.

To attain this, the present invention essentially comprises a generally rectangular table. The table has a top surface, a bottom surface, and a pair of long edges with short edges therebetween. The top surface of the table is smooth. The table has a length of fifty-four and one half inches and a width of about sixteen inches. The table has a thickness of about one inch for strength. One of the short edges of the table has a generally rectangular projection extending above and the top surface thereof. The projection is perpendicular to the top surface of the table and has a width equal to the width of the table. The projection has a length of about twelve inches and a thickness that is about seventy-five percent less than the thickness of the table. The back surface of the table has a plurality of large U-shaped support brackets, a plurality of small U-shaped support brackets, a plurality of leg retainers and a pair of triangular handles attached thereto. Each support bracket is attached to the bottom surface of the table with a pair of screws. Each leg retainer is attache to the bottom surface with a pair of screws. Each handle is adjacent anther of the short ends of the table and opposite the projection. Each handle has a base portion that is attached to the back surface with a pair of screws. Each handle has a flexible grip thereon. Also included is a plurality of legs. Each leg has a foot end and a connecting end that is rotatably coupled with one of each support brackets of the table. Each leg has a leg brace that is rotatbly coupled thereto with a rivet. The leg brace is a sectional leg brace that has a table end that is coupled to the bottom of the table with one of the small brackets. The leg brace has a midsection that is foldable at a pivot pin that couples the sections. The plurality of legs form a first support leg and a second support leg when a support bar connects a parallel pair of the plurality of legs. Each support leg rests on the parallel surface on the back surface of the table. Each support leg can be extended vertically and downward from the back surface to support the table above a receiving surface when each foot end is positioned on the receiving surface. Lastly, a wheel mount is included. The wheel mount has an elongated rigid bracket that is secured to the bottom surface of the table adjacent the projection. The bracket has a length of about fifteen inches and extends along the width of the back surface of the table. A pair of spaced stems with one of each stem extending from an end of the elongated bracket is included. A pair of wheels that are rotatably coupled to the stems with an axle is included. The axle extends the length of the elongated bracket and is positioned through one of each stem. The wheels are positioned in parallel planar alignment with the handles. The pair of wheels are above the receiving surface when a support leg is positioned on the receiving surface. The pair of wheels support the table along a vertical plane when each support leg is in a resting position along the back surface and the wheels are positioned on the receiving surface.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved convertible work bench to hand truck apparatus which has all of the advantages of the prior art portable work benches and none of the disadvantages.

It is another object of the present invention to provide a new and improved convertible work bench to hand truck apparatus which may be easily and efficiently manufactured and marketed.

It is further object of the present invention to provide a new and improved convertible work bench to hand truck apparatus which is of durable and reliable constructions.

An even further object of the present invention is to provide a new and improved convertible work bench to hand truck apparatus which is susceptible of a low cost of manufacture with regard to both materials and labor, and which accordingly is then susceptible of low prices of sale to the consuming public, thereby making such convertible work bench to hand truck apparatus economically available to the buying public.

Still yet another object of the present invention is to provide a new and improved convertible work bench to hand truck apparatus which provides in the apparatuses and methods of the prior art some of the advantages thereof, while simultaneously overcoming some of the disadvantages normally associated therewith.

Even still another object of the present invention is to provide a convertible work bench to hand truck apparatus for providing a work bench that is mobile for the convenience of the user and further providing a work bench that can be converted into a hand truck for transportation of heavy items by the user from one place to another.

Lastly, it is an object of the present invention to provide a new and improved convertible work bench to hand truck apparatus that includes a table. The table has a top surface, a bottom surface, and a pair of long edges with short edges therebetween. One of the short edges of the table has a projection extending above and perpendicular to the top surface of the table. The back surface of the table has a plurality of large U-shaped support brackets, a plurality of small U-shaped support brackets, a plurality of leg retainers and a pair of triangular handles attached thereto. Each support bracket and each leg retainer is attached to the bottom surface of the table with a pair of screws. A plurality of legs is included. Each leg has a foot end and a connecting end that is rotatably coupled with one of each support brackets of the table. The plurality of legs form a first support leg and a second support leg when a support bar connects a parallel pair of the plurality of legs. Each support leg is supporting the table above a receiving surface when each foot end is positioned thereon. Lastly, a wheel mount is included. The wheel mount has an elongated rigid bracket that is secured to the bottom surface of the table. The bracket has a pair of spaced stems with an axle therethrough. The axle is coupled to a pair of wheels.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
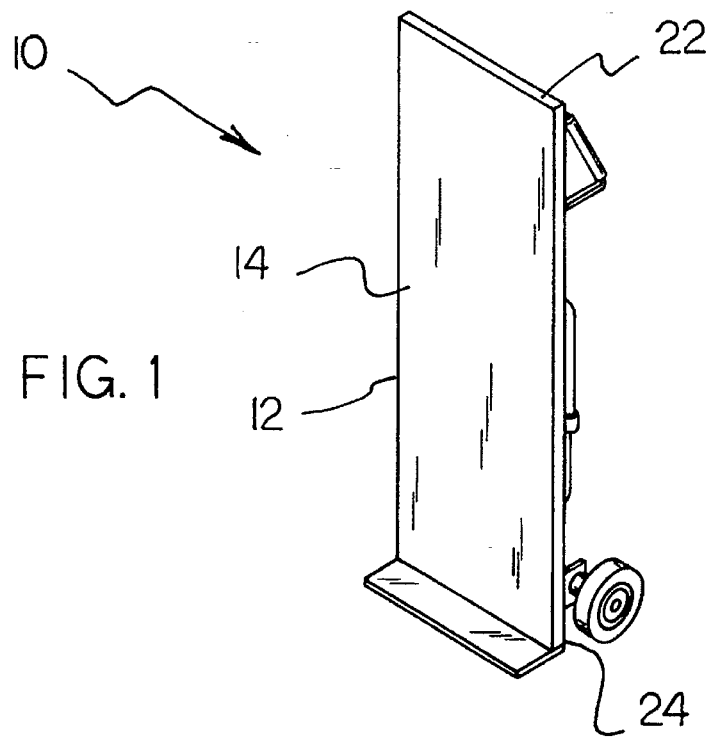
FIG. 1 is a perspective view of the preferred embodiment of the convertible work bench to hand truck apparatus constructed in accordance with the principles of the present invention.

With reference now to the drawings, and in particular to FIG. 1 thereof, the preferred embodiment of the new and improved convertible work bench to hand truck apparatus embodying the principles and concepts of the present invention and generally designated by the reference numeral 10 will be described.

The present invention, the convertible work bench to hand truck apparatus 10 is comprised of a plurality of components. Such components in their broadest context include a table, legs, a projection and handles. Such components are individually configured and correlated with respect to each other so as to attain the desired objective.

Figure 2:
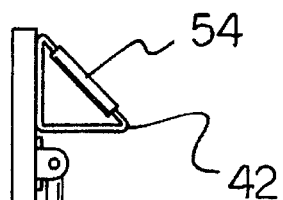
FIG. 2 is a side view of the preferred embodiment of the present invention in the hand truck operable position.
Figure 2:
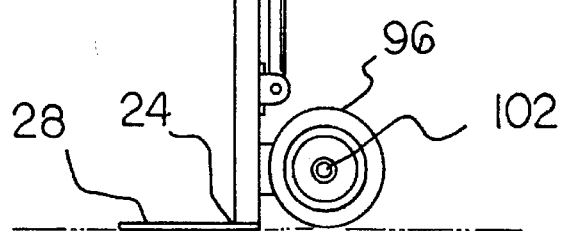

Specifically, the present invention includes a generally rectangular table 12, as shown in FIG. 1. The table has a top surface 14, a bottom surface 16, and a pair of long edges 18 and 20, with short edges 22 and 24 therebetween. The top surface of the table is smooth. The table is formed of a lightweight plastic or wood, both would give the table strength and ease of mobility. The table has a length of fifty-four and one half inches and a width of about sixteen inches. The table has a thickness of about one inch for strength. As illustrated in FIG. 2, one of the short edges 24 of the table has a generally rectangular projection 28 extending above top surface thereof. The projection is perpendicular to the top surface of the table and has a width equal to the width of the table. The projection has a length of about twelve inches and a thickness being about twenty-five percent less than the thickness of the table. The projection is integral with the table and formed of an identical material.

Figure 3:
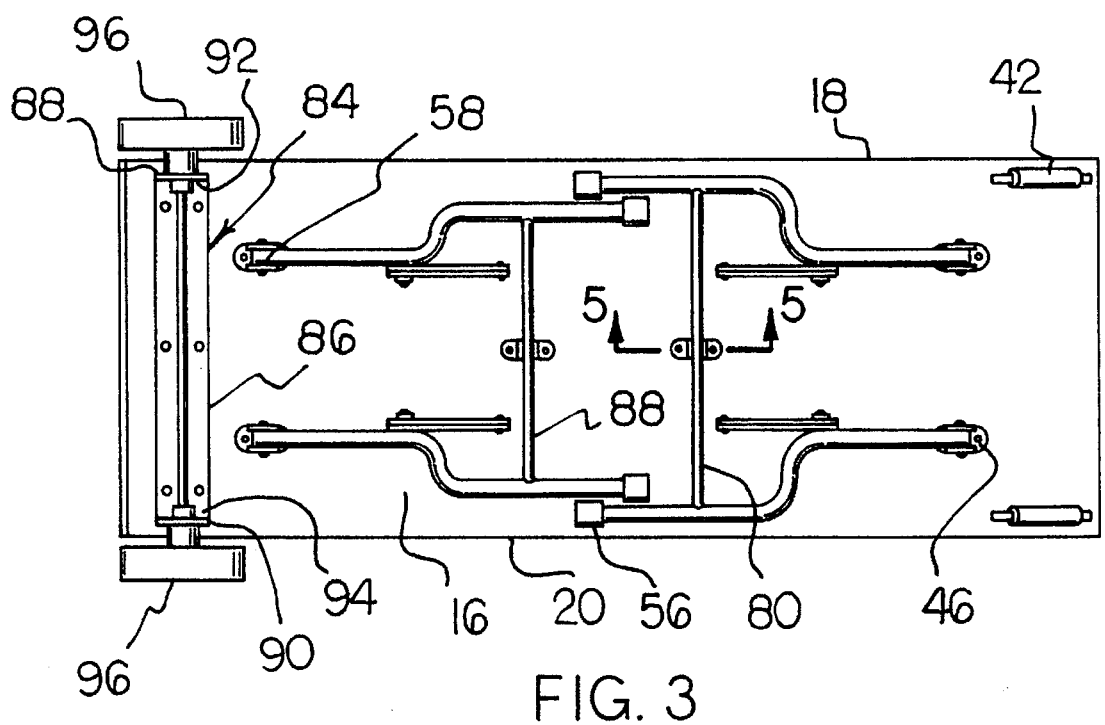
FIG. 3 is a bottom plan view of the present invention with the legs in a resting position.
Figure 4:
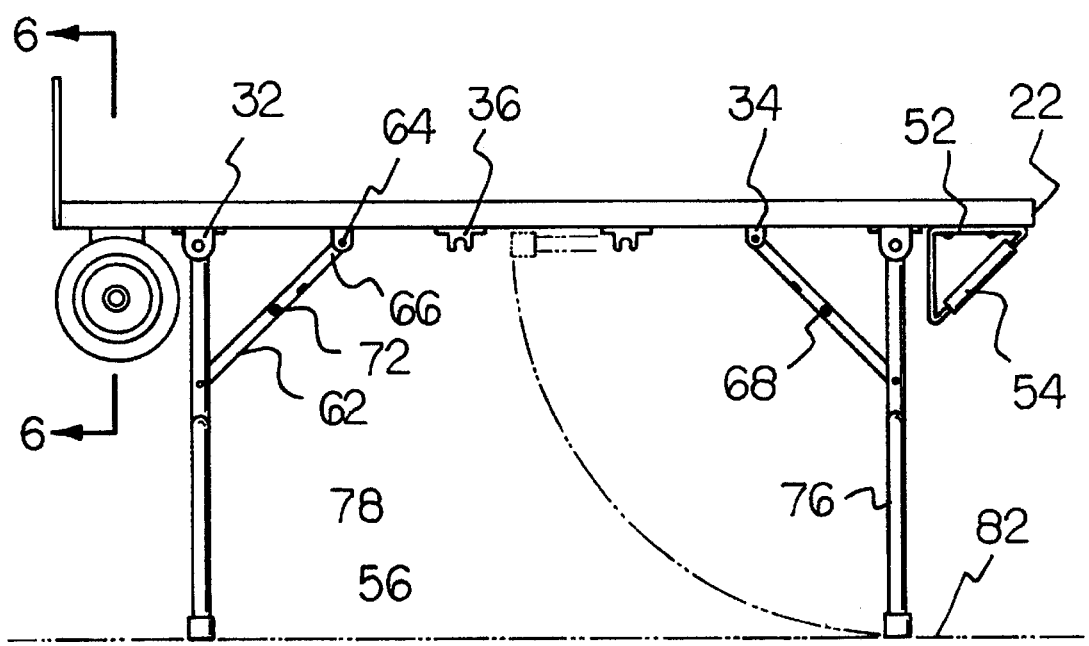
FIG. 4 is a work bench of the present invention in an operable position.

The back support 16 of the table has a plurality of large U-shaped support brackets 32, a plurality of small U-shaped support brackets 34, a plurality of leg retainers 36 and a pair of triangular handles 42 attached thereto. The large and small U-shaped support brackets of formed of metal. FIG. 3 depicts the back surface of the table. Each support bracket is attached to the bottom surface of the table with a pair of screws 46. Each leg retainer is attached to the bottom surface with a pair of screws 46. Each handle is positioned adjacent another of the short ends 22 of the table and opposite the projection, as shown in FIG. 4. Each handle has a base portion that is attached to the back surface with a pair of screws 46. Each handle has a flexible grip 54 thereon. The grip is preferably formed of a non-slip foam rubber material. This help the user keep a secure grip on the handles when using the apparatus as a hand truck.

A plurality of legs are included. Each leg has a foot end 56 and a connecting end 58 that is rotatably coupled with one of each large support bracket 32 of the table. Each leg has a leg brace 62 that is rotatbly coupled thereto with a rivet 64. The leg brace is a sectional leg brace. Each section of the leg brace has a table end 66 that is coupled to the bottom of the table with one of the small support brackets 34. The leg brace has a midsection 68 that is foldable at a pivot pin 72 to couple the sections. The leg brace is linear and extends at a sixty degree angle downward, when attached at the table's end, toward the leg for coupling to form a sixty degree angle with the leg. The angle is fromed with the leg when the legs extends vertically from the back of the table.

Figure 5:
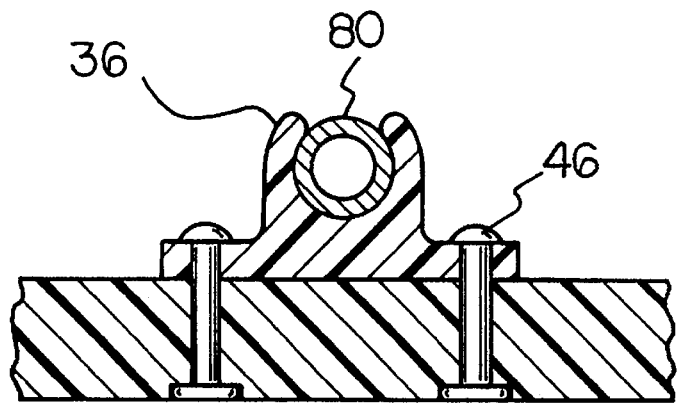
FIG. 5 is a cross sectional view of the leg retainers of the present invention taken along line 5—5.

The plurality of legs form a first support leg 76 and a second support leg 78 when a support bar 80 connects a parallel pair 76 and 78 of the plurality of legs. Each support leg is capable of resting in a parallel plane on the back surface 16 of the table 12. The support bar of each leg, as shown in FIG. 5, releasably couples with one of the leg retainers to support the first and second support legs onto the back surface when the legs are resting. Each support leg can be extended vertically and downward from the back surface to support the table above a receiving surface 82 when each foot end 56 is positioned on the receiving surface. The legs and the leg braces are formed of metal. The legs are cylindrical and hollow to add to the reduced weight of the apparatus.

A wheel mount 84, as shown in FIG. 3, is included. The wheel mount has an elongated rigid bracket 86 that is secured to the bottom surface 16 of the table 12 adjacent the projection. The bracket is formed of metal and has a length of about fifteen inches. The length of the bracket extends along the width of the back surface of the table. A pair of spaced stems 88 and 90 are integral the bracket with one of each stem extending from an end 92 and 94 of the bracket. A pair of wheels 96 is rotatably coupled to the stems with an axle 98. The axle extends the length of the elongated bracket and is positioned through one of each stem 88 and 90.

Figure 6:
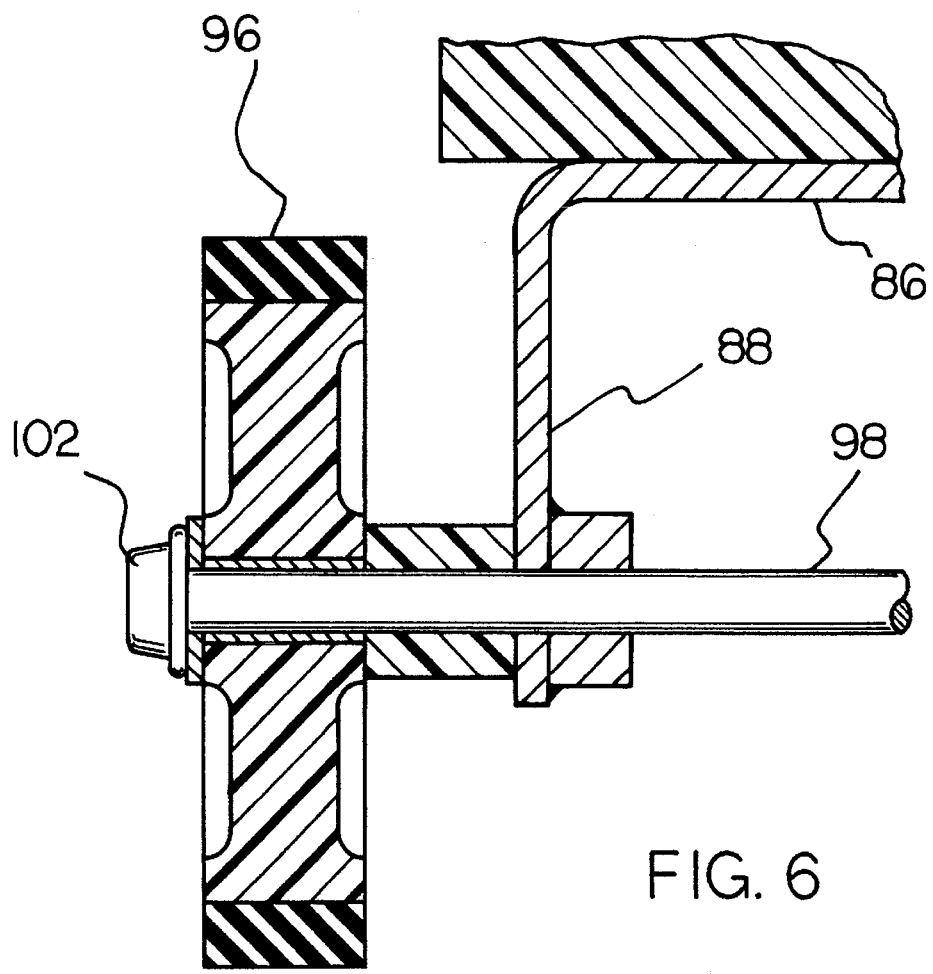
FIG. 6 is a sectional view of the wheel mount and wheel of the present invention taken along line 6—6.

As best illustrated in FIG. 6, the wheels are secured on to the axle by an axle nut 102. The axle and axle nut are formed of metal. The wheel is positioned in a parallel planar alignment with the handles 42. The pair of wheels are positioned above the receiving surface 82 when each support leg, 76 and 78, is positioned on the receiving surface. The pair of wheels support the table along a vertical plane when each support leg is in the resting position along the back surface, and the wheels are positioned on the receiving surface. The wheels of the present invention are formed from standard rubber material and are tubeless. The apparatus may be used as a hand truck to transport heavy items when the wheels are on the receiving surface, and the table is in a vertical position with the receiving surface.

The present invention is a convertible work bench to hand truck that has a table with a projection at one end, support legs on a back surface and wheels at the end on the opposite surface from the projection. The apparatus is made from a rigid lightweight plastic or wood. The handles, legs, and brackets are formed of metal. When the apparatus is used as the hand truck, the table is in a vertical position and is supported by a pair of wheels. The hand truck is moved forward from one place to the other by the user using the handles to push the hand truck bench apparatus along the wheels. The thickness of the table portion of this apparatus ensures the apparatus is sturdy. Table strength is needed that when the apparatus is used as a work bench or as a hand truck. Sturdiness ensures that the apparatus is able to support the items that it is carrying or that it is holding above the ground. The width of the apparatus is shorter than a normal width of a table, this allows it to be more mobile and to be used in a variety of spaces as needed by the work person. When the apparatus is not in use, it can be stored like a hand truck once the legs are folded back against the back surface of the table.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved convertible work bench to hand truck apparatus for using as a work table and for transporting heavy items comprising in combination:

a generally rectangular table having a top surface, a bottom surface and a pair of long edges with short edges therebetween, the top surface of the table being smooth, the table having a length of 54½ inches and a width of about 16 inches, the table having a thickness of about 1 inch for strength, one of the short edges of the table having a generally rectangular projection extending above the top surface thereof, the projection being perpendicular the top surface of the table and having a width equal to the width of the table, the projection having a length of about 12 inches and a thickness being about seventy-five percent less than the thickness of the table;

the back surface of the table having a plurality of large U-shaped support brackets, a plurality of small U-shaped support brackets, a plurality of leg retainers and a pair of triangular handles attached thereto, each support bracket being attached to the bottom surface of the table with a pair of screws, each leg retainer being attached to the bottom surface with a pair of screws, each handle being position adjacent another of the short ends of the table and opposite the projection, each handle having a base portion being attached to the back surface with a pair of screws, each handle having a flexible grip thereon;

a plurality of legs with each leg having a foot end and a connecting end being rotatably coupled with one of each support brackets of the table, each leg having a leg brace rotatably coupled thereto with a rivet, the leg brace being a sectional leg brace having a table end being coupled to the bottom surface of the table with one of the small support brackets, the leg brace having a mid section foldable at a pivot pin coupling the sections;

the plurality of legs form a first support leg and a second support leg when a support bar connects a parallel pair of the plurality of legs, each support leg being capable of resting in a parallel plane on the back surface of the table, each support leg extending vertically and downward from the back surface for supporting the table above a receiving surface when each foot end being positioned on the receiving surface;

a wheel mount having an elongated rigid bracket being secured to the bottom surface of the table adjacent the projection, the bracket having a length of about 15 inches and extending along the width of the back surface, a pair of spaced stems with one of each stem extending from an end of the elongated bracket, a pair of wheels rotatably coupled to the stems with an axle that extends the lenght of the elongated bracket and positioned through one of each stem; and the wheels being positionable in parallel planar alignment with the handles, the pair of wheels being above the receiving surface when each support leg being position on the receiving surface, the pair of wheels supporting the table along a vertical plane when each support leg being in the resting position along the back surface.

2. A convertible work bench to hand truck comprising:

a table having a top surface, a bottom surface and a pair of long edges with short edges therebetween, one of the short edges of the table having a generally rectangular projection extending above and perpendicular to the top surface;

the back surface of the table having a plurality of large U-shaped support brackets, a plurality of small U-shaped support brackets, a plurality of leg retainers and a pair of triangular handles attached thereto, each support bracket and each leg retainer being attached to the bottom surface of the table with a pair of screws;

a plurality of legs with each leg having a foot end and a connecting end being rotatably coupled with one of each support brackets of the table, the plurality of legs form a first support leg and a second support leg when a support bar connects a parallel pair of the plurality of legs, each support leg being capable of supporting the table above a receiving surface when each foot end being positioned thereon; and a wheel mount having an elongated rigid bracket being secured to the bottom surface of the table and having a pair of spaced stems with an axle therethrough, the axle having coupled thereto a pair of wheels.

3. The convertible work bench to hand truck as set forth in claim 2 wherein the table having a length of 54½ inches and a width of about 16 inches, the table having a thickness of about 1 inch for strength and a the top surface of the table being smooth for comfortable use.

4. The convertible work bench to hand truck as set forth in claim 3 wherein the projection having a width equal to the width of the table and a length of about 12 inches, the projection having a thickness being about seventy-five percent less than the thickness of the table.

5. The convertible work bench to hand truck as set forth in claim 2 wherein each handle being position adjacent another of the shore ends of the table and opposite the projection, each handle being configured light a right triangle and having a base portion being attached to the back surface, each handle having a flexible grip thereon.

6. The convertible work bench to hand truck as set forth in claim 2 wherein each leg having a leg brace being coupled thereto with a rivet, the leg brace being a sectional leg brace having a table end being coupled to one of the small support brackets of the bottom surface of the table, the leg brace having a mid section with a pivot pin for coupling of the sections, the leg brace capable of being folded at the pivot pin as the leg brace rotates about the rivet to allow each support leg to rest on the back surface of the table.

7. The convertible work bench to hand truck as set forth in claim 2 wherein the elongated bracket of the wheel mount being adjacent the projection, and having a length of about 15 inches to extend along the width of the back surface, and the axle extends the length of the elongated bracket.

8. The convertible work bench to hand truck as set forth in claim 7 wherein the elongated bracket support the pair of wheels above the receiving surface when each support leg being position on the receiving surface, and allowing the pair of wheels to the table along a vertical plane when each support leg being in the resting position along the back surface.

* * * * *